US012674891B2

(12) United States Patent
Yang et al.

(10) Patent No.: US 12,674,891 B2
(45) Date of Patent: Jul. 7, 2026

(54) SENSOR STATIC MISS DETECTION BY MONITORING OCCUPANCY VALUES

(71) Applicant: Motional AD LLC, Boston, MA (US)

(72) Inventors: Jiong Yang, Singapore (SG); You Hong Eng, Singapore (SG); James Fu, Singapore (SG); Pan Yu, Singapore (SG)

(73) Assignee: Motional AD LLC, Boston, MA (US)

( * ) Notice: Subject to any disclaimer, the term of this patent is extended or adjusted under 35 U.S.C. 154(b) by 1110 days.

(21) Appl. No.: 17/654,375

(22) Filed: Mar. 10, 2022

(65) Prior Publication Data

US 2023/0041716 A1 Feb. 9, 2023

Related U.S. Application Data

(60) Provisional application No. 63/229,204, filed on Aug. 4, 2021.

(51) Int. Cl.
B60W 50/04 (2006.01)
G01S 7/40 (2006.01)
(Continued)

(52) U.S. Cl.
CPC ............ G01S 17/89 (2013.01); G01S 17/931 (2020.01)

(58) Field of Classification Search
CPC ...... G01S 17/89; G01S 17/931; G01S 7/4039; G01S 13/89; G01S 13/931; G01S 2007/4975; G01S 7/497; G01S 7/40; G01S 7/52; G01S 7/5205; G01S 13/02;

G01S 15/02; G01S 17/02; B60W 50/04; B60W 40/02; B60W 2050/0043; B60W 2554/20; B60W 2554/40
(Continued)

(56) References Cited

U.S. PATENT DOCUMENTS 11,495,030 B1 * 11/2022 Kimchi .................. G06V 20/17
11,640,764 B1 * 5/2023 Alonso Lopez ......... G08G 5/21
701/7
(Continued)

FOREIGN PATENT DOCUMENTS

EP 3594719 A1 1/2020

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — Jelani A Smith
*Assistant Examiner* — George A Alcorn, III
(74) *Attorney, Agent, or Firm* — Knobbe, Martens, Olson & Bear, LLP

(57) ABSTRACT

Systems and methods are described for monitoring detection of objects in a sensor. The system can generate an occupancy array based on scene data corresponding to a scene of a vehicle. The array can include points that represent a location within the environment of the vehicle and an occupancy value that indicates whether an object is detected at that location. The system can modify an occupancy value of at least one point in the array and identify at least one static object miss based on a group of occupancy values of a group of points in the array.

15 Claims, 11 Drawing Sheets

(51) Int. Cl.

| | |
|---|---|
| *G01S 7/497* | (2006.01) |
| *G01S 7/52* | (2006.01) |
| *G01S 13/02* | (2006.01) |
| *G01S 13/89* | (2006.01) |
| *G01S 13/931* | (2020.01) |
| *G01S 15/02* | (2006.01) |
| *G01S 17/02* | (2020.01) |
| *G01S 17/89* | (2020.01) |
| *G01S 17/931* | (2020.01) |

(58) Field of Classification Search
USPC .......................................................... 701/400
See application file for complete search history.

(56) References Cited

U.S. PATENT DOCUMENTS

| | | | | |
|---|---|---|---|---|
| 2012/0070071 | A1* | 3/2012 | Rankin | .................. G06V 20/58 |
| | | | | 382/154 |
| 2020/0103523 | A1* | 4/2020 | Liu | .......................... G01S 13/87 |
| 2020/0202107 | A1* | 6/2020 | Ozkucur | ................. G06F 18/22 |
| 2020/0256999 | A1* | 8/2020 | Yellepeddi | .............. G01S 17/89 |
| 2020/0271787 | A1 | 8/2020 | You et al. | |
| 2021/0327128 | A1* | 10/2021 | Yu | ........................... G06T 19/20 |
| 2021/0354690 | A1 | 11/2021 | Yershov et al. | |
| 2023/0036838 | A1* | 2/2023 | Slobodyanyuk | .... B60W 60/001 |
| 2023/0146312 | A1 | 5/2023 | Batts et al. | |
| 2023/0267746 | A1* | 8/2023 | Ichiki | .................. G06V 10/761 |
| | | | | 348/148 |
| 2023/0324917 | A1* | 10/2023 | Kitai | ....................... G01S 17/42 |
| | | | | 701/28 |

OTHER PUBLICATIONS

Great Britain Office Action issued for Application No. GB 2211115.
7, dated Jan. 31, 2023.
Korean Office Action received for KR Application No. 10-2022-
0097427, mailed Dec. 3, 2024.
Korean Office Action received for KR Application No. 10-2022-
0097427, mailed Sep. 16, 2025.

* cited by examiner

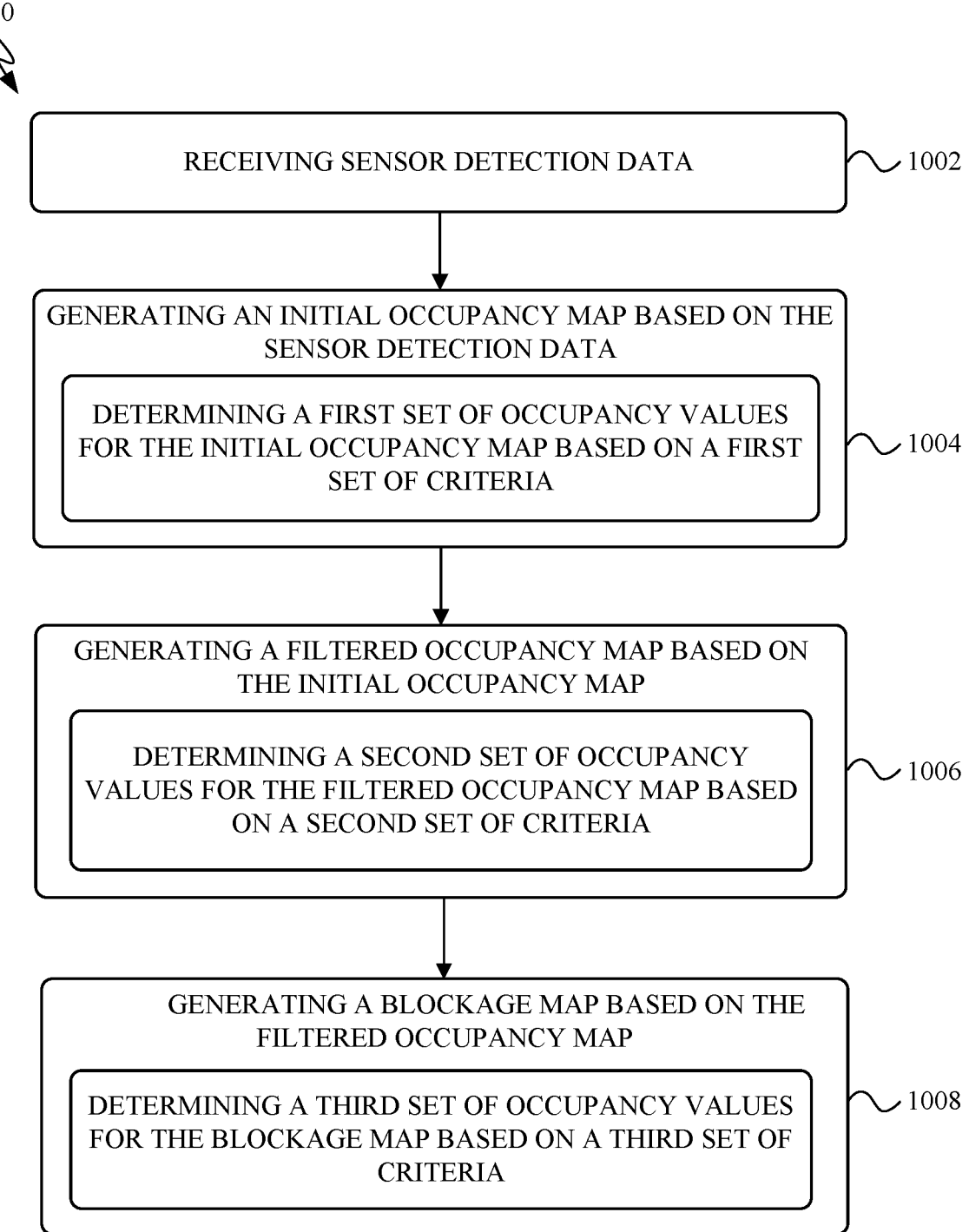

1000

RECEIVING SENSOR DETECTION DATA — 1002

GENERATING AN INITIAL OCCUPANCY MAP BASED ON THE SENSOR DETECTION DATA

DETERMINING A FIRST SET OF OCCUPANCY VALUES FOR THE INITIAL OCCUPANCY MAP BASED ON A FIRST SET OF CRITERIA

— 1004

GENERATING A FILTERED OCCUPANCY MAP BASED ON THE INITIAL OCCUPANCY MAP

DETERMINING A SECOND SET OF OCCUPANCY VALUES FOR THE FILTERED OCCUPANCY MAP BASED ON A SECOND SET OF CRITERIA

— 1006

GENERATING A BLOCKAGE MAP BASED ON THE FILTERED OCCUPANCY MAP

DETERMINING A THIRD SET OF OCCUPANCY VALUES FOR THE BLOCKAGE MAP BASED ON A THIRD SET OF CRITERIA

1102
RECEIVE SCENE DATA

1104
GENERATE OCCUPANCY ARRAY

1106
MODIFY OCCUPANCY VALUE OF AT LEAST ONE POINT

1108
IDENTIFY AT LEAT ONE STATIC OBJECT MISS

SENSOR STATIC MISS DETECTION BY MONITORING OCCUPANCY VALUES

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BRIEF DESCRIPTION OF THE DRAWINGS

FIG. 10 shows a flow chart illustrating a process for identifying sensor blockages of the lidar system.

DETAILED DESCRIPTION

Figure 1:
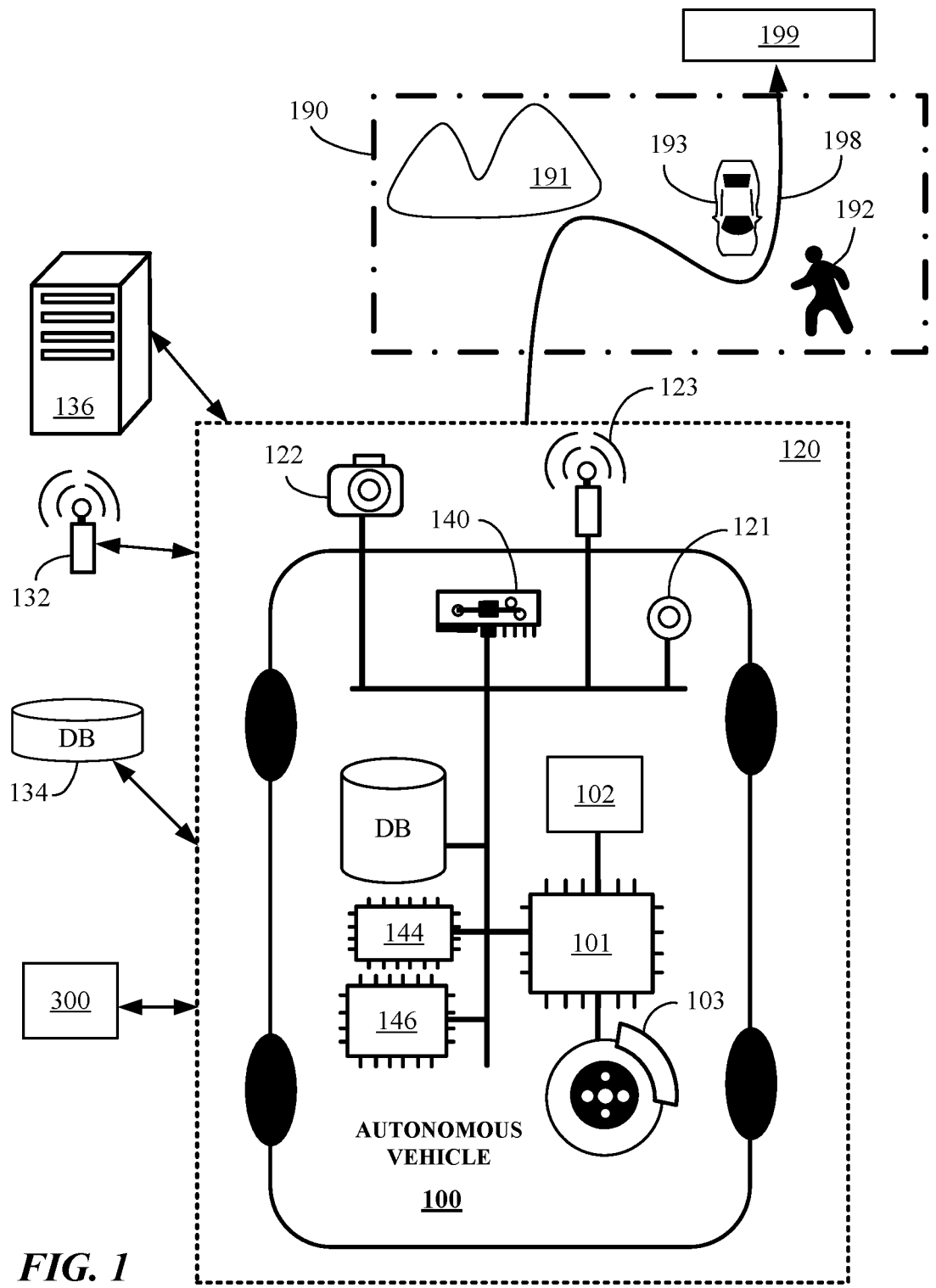
FIG. 1 shows an example of an autonomous vehicle having autonomous capability.

In the following description, for the purposes of explanation, numerous specific details are set forth in order to provide a thorough understanding of the disclosed techniques. It will be apparent, however, that the disclosed techniques may be practiced without these specific details. In other instances, well-known structures and devices are shown in block diagram form in order to avoid unnecessarily obscuring the disclosed techniques.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements.

For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Sensor Blockage Detection
6. Example Process for Detecting Sensor Blockages and Operating the Sensor Based on the Detection of the Sensor Blockages

General Overview

Properly functioning imaging sensors are important for an autonomous vehicle to safely navigate. If an imaging sensor is not functioning properly, the risk to passengers and damage to the vehicle can increase significantly. It can be difficult, however, for a system to determine when an imaging sensor is no longer functioning properly.

One role of some imaging sensors is to detect objects in a scene of the vehicle. These imaging sensors can include lidar sensors, radar sensor, sonar sensors, etc., or other sensors that emit a wave or beam and use the reflection from objects to determine the presence (and location) of object in the scene of the vehicle. In some cases, certain pixels of an image (or points in an array that corresponds to the image) may not register or detect an object (also referred to herein as an "object miss" or "object undetection").

An object miss due to the environment or other transitory factors may be expected, but an object miss due to a sensor malfunction or sensor blockage that does not resolve itself in a relatively short period of time may be unsafe and increase the risk of harm to passengers in the vehicle and others around the vehicle. To address this issue, a system can monitor incoming scene data and determine whether object misses or undetections at different points or pixels are transitory (e.g., due to the environment, other transitory factors, or are of a relatively short duration) or static (e.g., of a relatively long duration and/or due to some other factor that may rely on active steps to resolve). If the system determines that an object miss is static, it can take one or more actions to ameliorate the issue. By monitoring and detecting static object misses, the system described herein can improve the functioning of imaging sensors and autonomous vehicles. Specifically, the system can increase the safety of an autonomous vehicle. Moreover, the techniques described herein for detecting static object misses cannot, or at least cannot feasibly, be performed by a human given at least the nature of the sensors being used, the data being analyzed, and the time constraints by which an autonomous vehicle is to perceive its environment and take actions based on its perception of the environment.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, lidar 123, radar, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
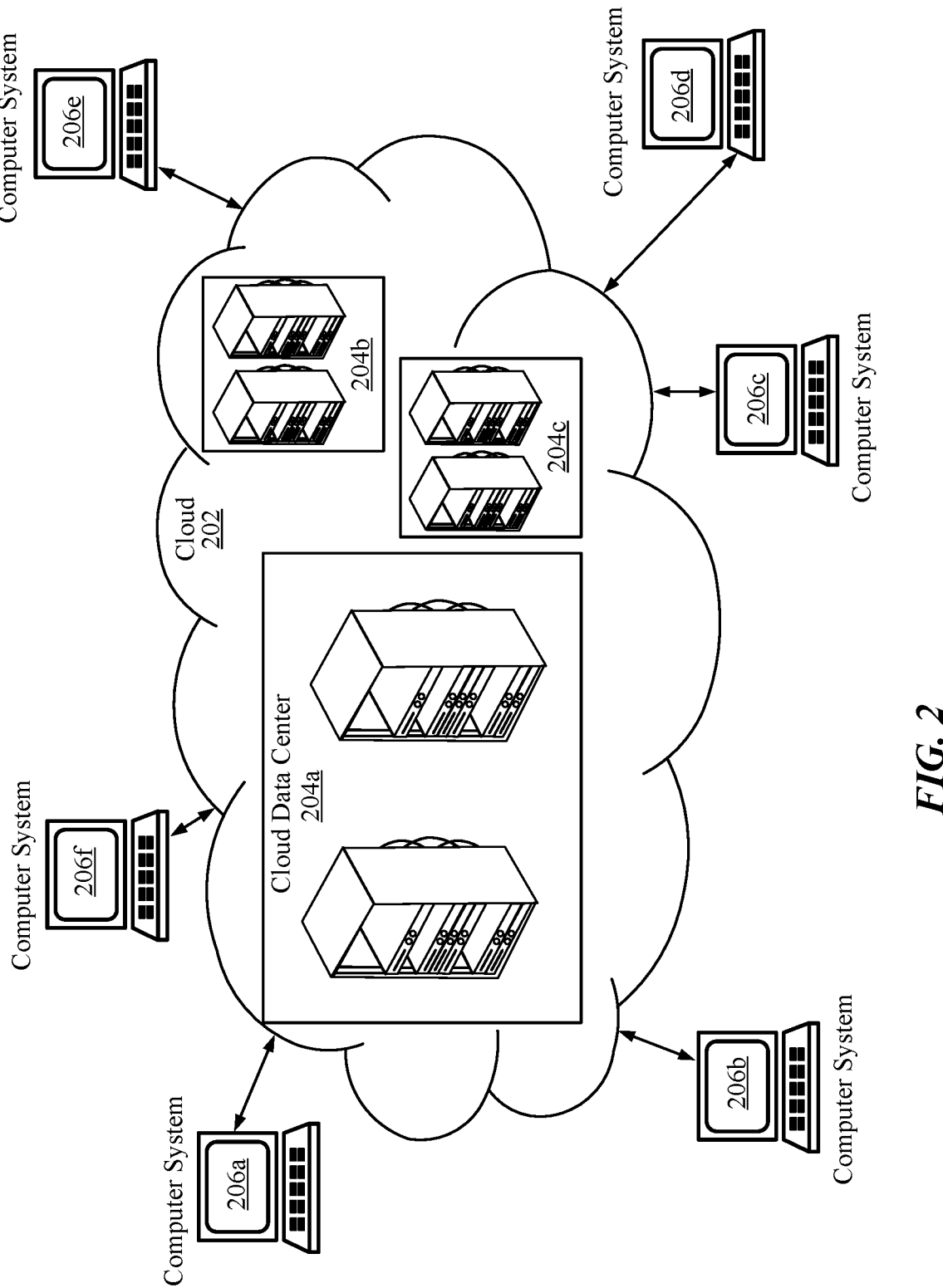
FIG. 2 shows an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204*a*, 204*b*, and 204*c* that are interconnected through the cloud 202. Data centers 204*a*, 204*b*, and 204*c* provide cloud computing services to computer systems 206*a*, 206*b*, 206*c*, 206*d*, 206*e*, and 206*f* connected to cloud 202.

The cloud computing environment 200 includes one or more cloud data centers. In general, a cloud data center, for example the cloud data center 204*a* shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204*a* has many computing systems distributed through many racks.

The cloud 202 includes cloud data centers 204*a*, 204*b*, and 204*c* along with the network and networking resources (for example, networking equipment, nodes, routers, switches, and networking cables) that interconnect the cloud data centers 204*a*, 204*b*, and 204*c* and help facilitate the computing systems' 206*a-f* access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206*a-f* or cloud computing services consumers are connected to the cloud 202 through network links and network adapters. In an embodiment, the computing systems 206*a-f* are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206*a-f* are implemented in or as a part of other systems.

Figure 3:
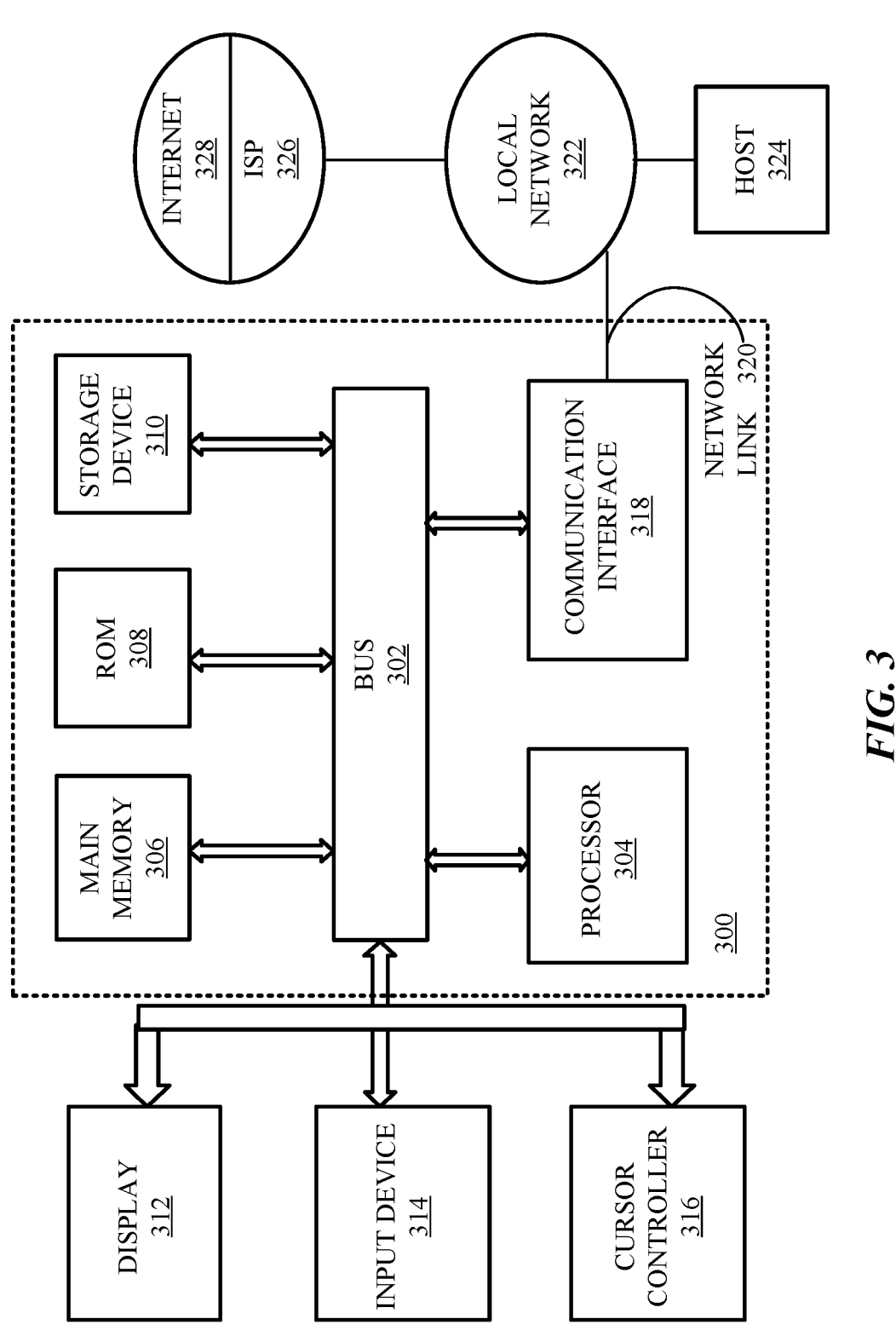
FIG. 3 shows a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
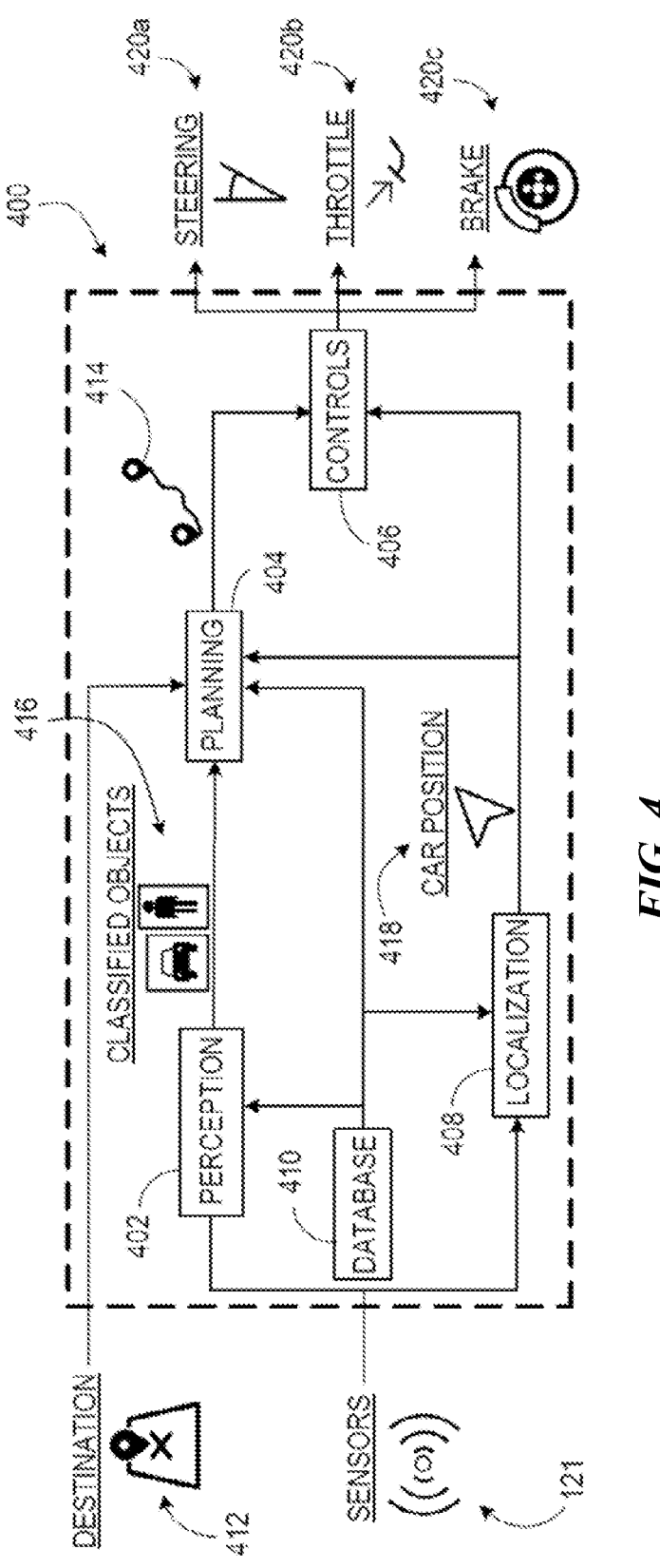
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420*a-c* (e.g., steering, throttling, braking, ignition) of the AV in a manner that will cause the AV 100 to travel the trajectory 414 to the destination 412. For example, if the trajectory 414 includes a left turn, the control module 406 will operate the control functions 420*a-c* in a manner such that the steering angle of the steering function will cause the AV 100 to turn left, and the throttling and braking will cause the AV 100 to pause and wait for passing pedestrians or vehicles before the turn is made.

Autonomous Vehicle Inputs

Figure 5:
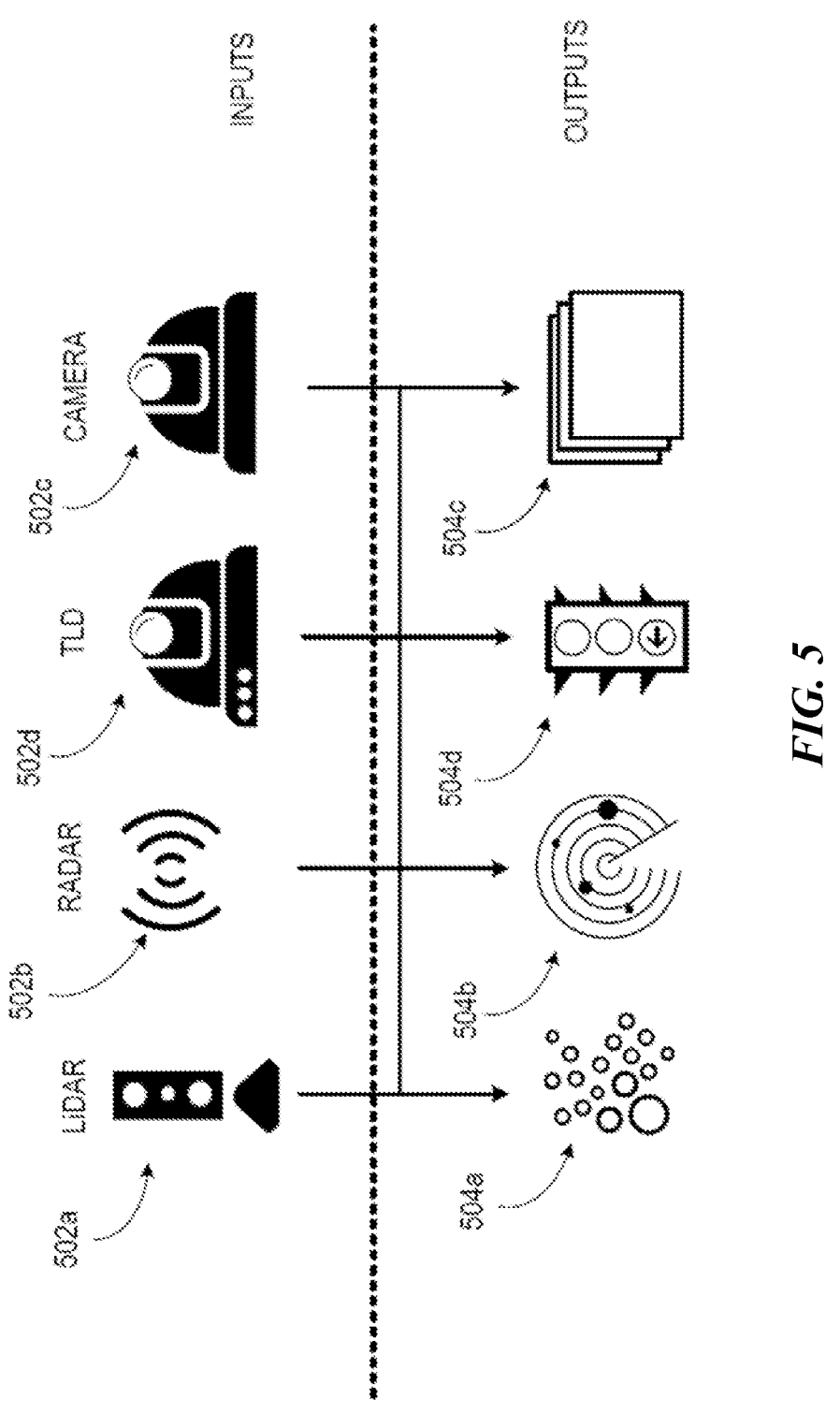
FIG. 5 shows an example of inputs and outputs that can be used by a perception module.

FIG. 5 shows an example of inputs 502*a-d* (e.g., sensors 121 shown in FIG. 1) and outputs 504*a-d* (e.g., sensor data) that are used by the perception module 402 (FIG. 4). One input 502*a* is a lidar (Light Detection and Ranging) system (e.g., lidar 123 shown in FIG. 1). lidar is a technology that uses light (e.g., bursts of light such as infrared light) to obtain data about physical objects in its line of sight. A lidar system produces lidar data as output 504*a*. For example, lidar data is collections of 3D or 2D points (also known as a point clouds) that are used to construct a representation of the environment 190.

Another input 502*b* is a radar system. radar is a technology that uses radio waves to obtain data about nearby physical objects. radars can obtain data about objects not within the line of sight of a lidar system. A radar system 502*b* produces radar data as output 504*b*. For example, radar data are one or more radio frequency electromagnetic signals that are used to construct a representation of the environment 190.

Another input 502*c* is a camera system. A camera system uses one or more cameras (e.g., digital cameras using a light sensor such as a charge-coupled device [CCD]) to obtain information about nearby physical objects. A camera system produces camera data as output 504*c*. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502*d* is a traffic light detection (TLD) system. A TLD system uses one or more cameras to obtain information about traffic lights, street signs, and other physical objects that provide visual navigation information. A TLD system produces TLD data as output 504*d*. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504*a-d* are combined using a sensor fusion technique. Thus, either the individual outputs 504*a-d* are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
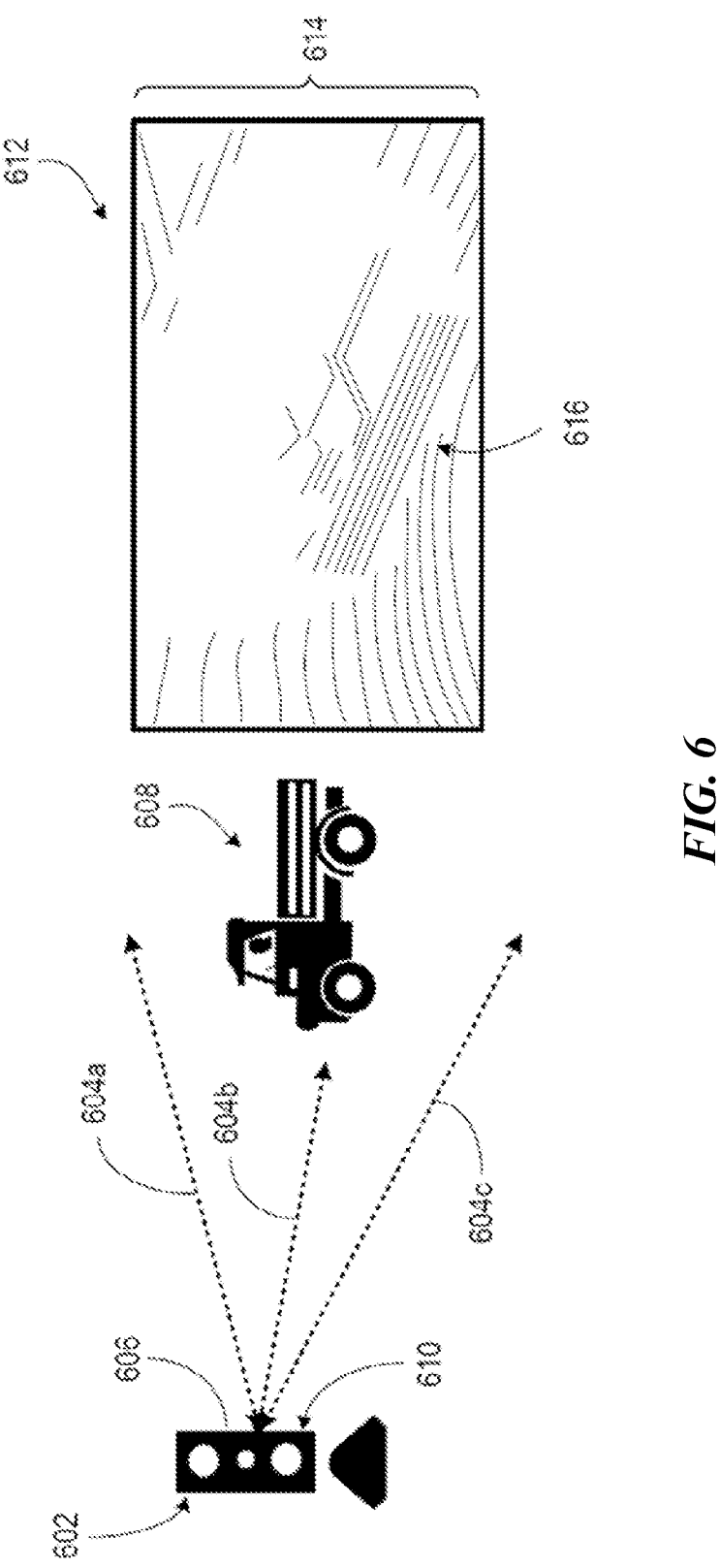
FIG. 6 shows an example of a lidar system.

FIG. 6 shows an example of a lidar system 602 (e.g., the input 502*a* shown in FIG. 5). The lidar system 602 emits light 604*a-c* from a light emitter 606 (e.g., a laser transmitter). Light emitted by a lidar system is typically not in the visible spectrum; for example, infrared light is often used. Some of the light 604*b* emitted encounters a physical object 608 (e.g., a vehicle) and reflects back to the lidar system 602. (Light emitted from a lidar system typically does not penetrate physical objects, e.g., physical objects in solid form.) The lidar system 602 also has one or more light detectors 610, which detect the reflected light. In an embodiment, one or more data processing systems associated with the lidar system generates an image 612 representing the field of view 614 of the lidar system. The image 612 includes information that represents the boundaries 616 of a physical object 608. In this way, the image 612 is used to determine the boundaries 616 of one or more physical objects near an AV.

Figure 7:
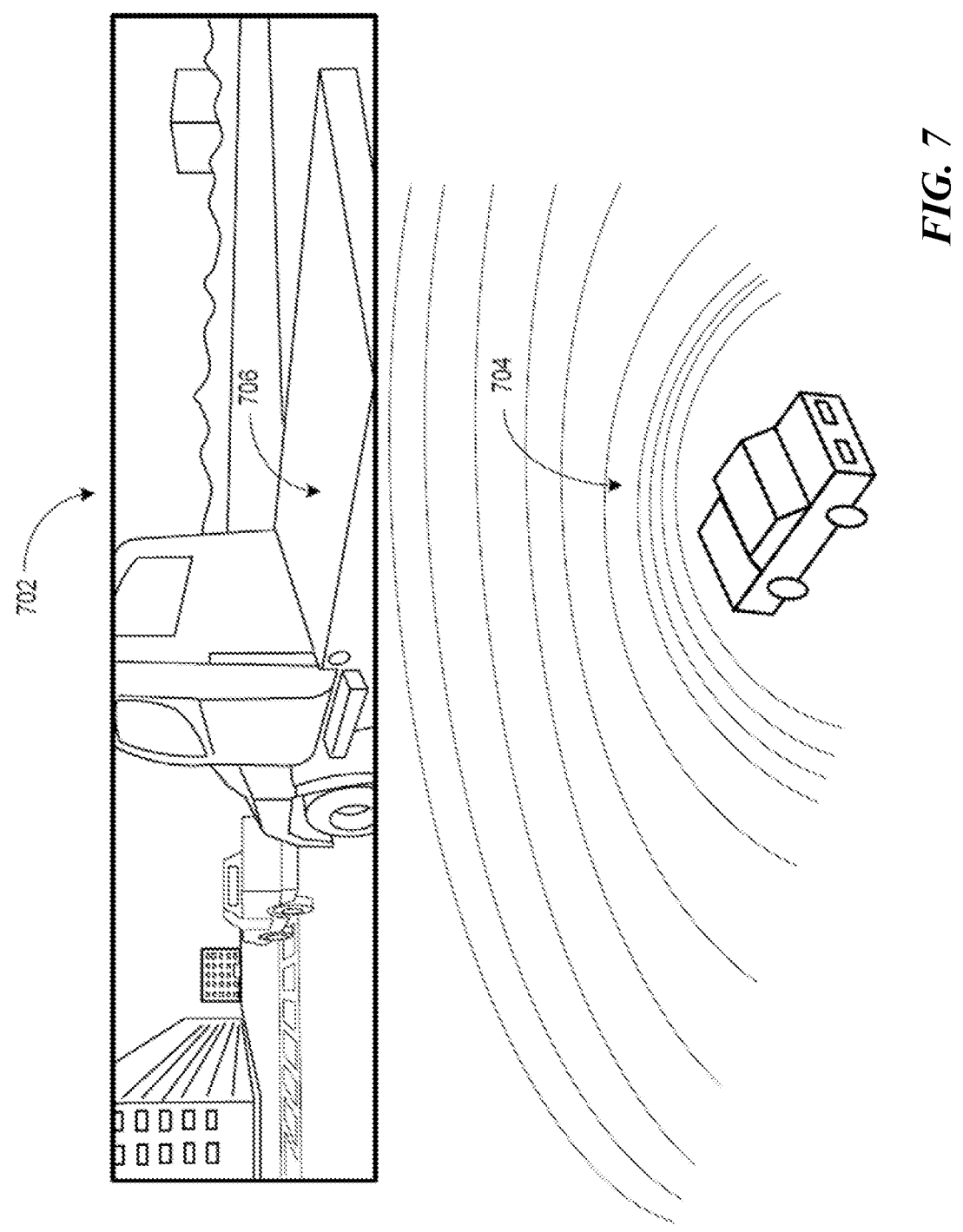
FIG. 7 shows the lidar system in operation.

FIG. 7 shows the lidar system 602 in operation. In the scenario shown in this figure, the AV 100 receives both camera system output 504*c* in the form of an image 702 and lidar system output 504*a* in the form of lidar data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
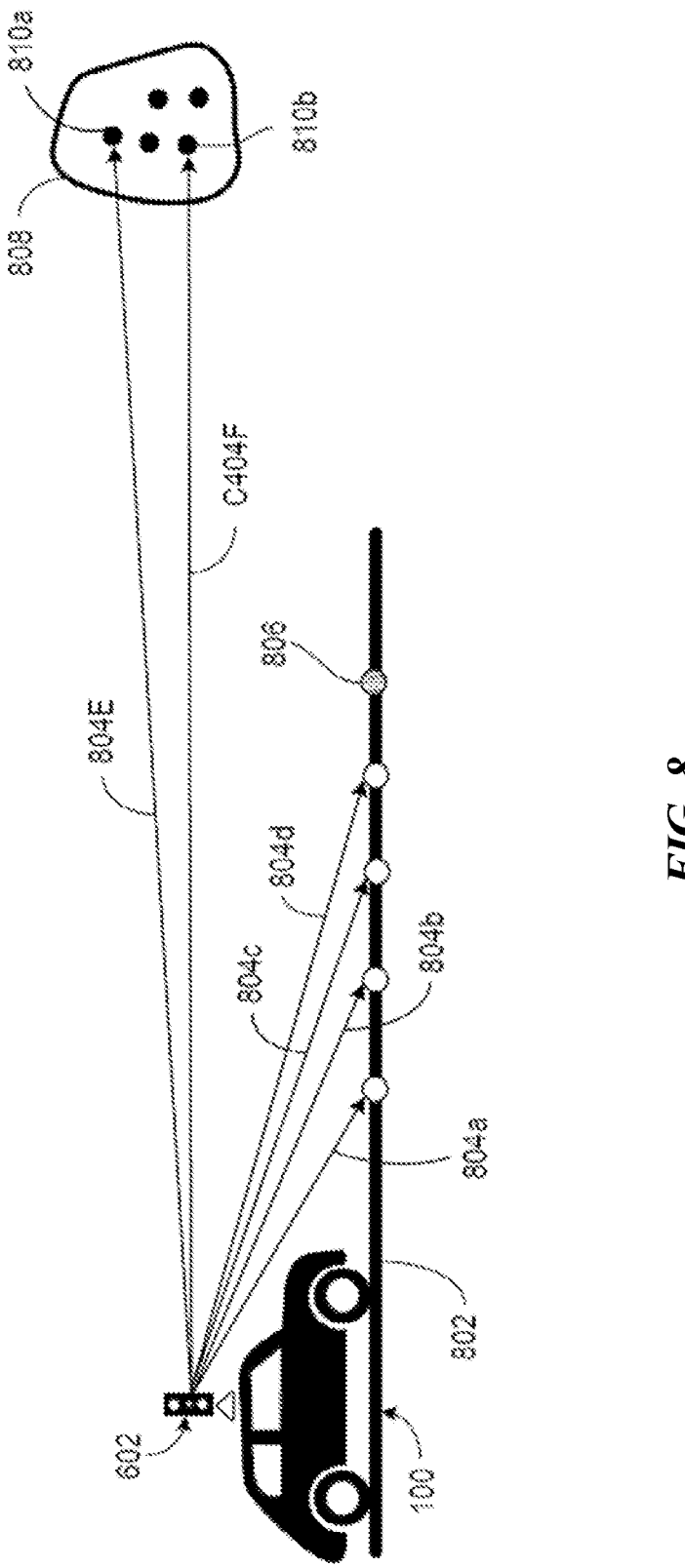
FIG. 8 shows the operation of the lidar system in additional detail.

FIG. 8 shows the operation of the lidar system 602 in additional detail. As described above, the AV 100 detects the boundary of a physical object based on characteristics of the data points detected by the lidar system 602. As shown in FIG. 8, a flat object, such as the ground 802, will reflect light 804*a-d* emitted from a lidar system 602 in a consistent manner. Put another way, because the lidar system 602 emits light using consistent spacing, the ground 802 will reflect light back to the lidar system 602 with the same consistent spacing. As the AV 100 travels over the ground 802, the lidar system 602 will continue to detect light reflected by the next valid ground point 806 if nothing is obstructing the road. However, if an object 808 obstructs the road, light 804*e-f* emitted by the lidar system 602 will be reflected from points 810*a-b* in a manner inconsistent with the expected consistent manner. From this information, the AV 100 can determine that the object 808 is present. Although described with reference to a lidar, it will be understood that obstructions can occur and be identified in sensors using different underlying technologies, such as, but not limited to, radar, camera, sonar, etc.

Lidar Sensor Blockage Detection/Static Object Miss Detection

Figure 9A:
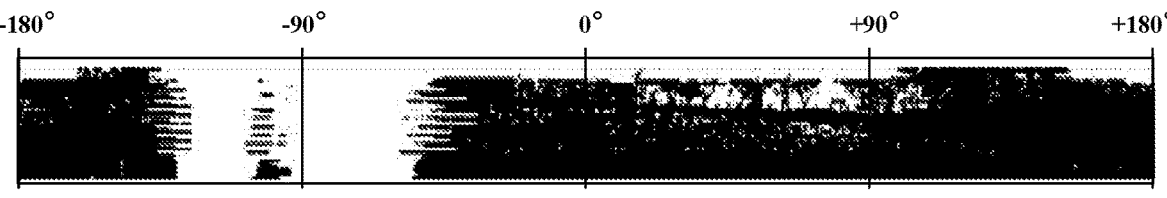
FIGS. 9A-9C show exemplary sensor detection data generated by a lidar system.
Figure 9B:
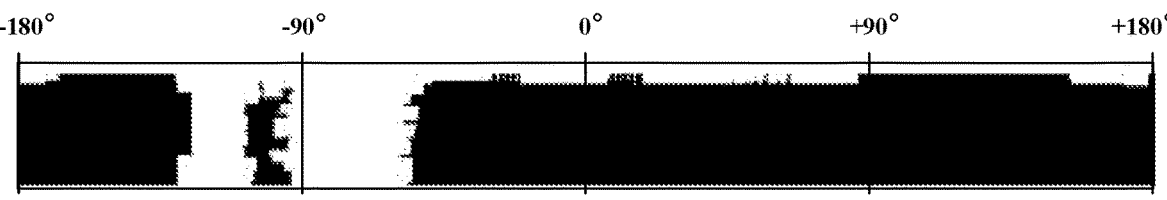
Figure 9C:
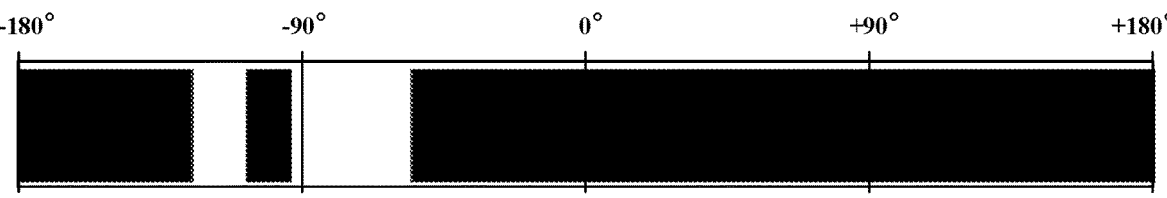

FIGS. 9A-9C represent sensor detections generated by a lidar sensor of AV 100. Although reference is made to a lidar sensor with regard to FIGS. 9A-9C, it will be understood that other types of sensors can be used and occupancy maps generated for other technologies, such as, but not limited to radar, camera, sonar, etc.

FIG. 9A shows an initial occupancy map representing sensor detection data for a 360-degree field of view of the lidar sensor. The initial occupancy map can be generated based on scene data received from the lidar sensor (or other sensor as mentioned). A horizontal dimension of the initial occupancy map represents azimuth or any other x-axis value corresponding to an angular measurement (degrees, radians, mils, etc.) of a direction of arrival of the sensor detection data. A vertical dimension of the initial occupancy map represents elevation or any other y-axis value corresponding to a height at which light emitted by the lidar is reflected back into the lidar sensor. For example, the lidar sensor can be configured to receive reflected light from elevation angles between 30 and −30 degrees. In one particular configuration, the lidar sensor can receive light from elevation angles up to 15 degrees and as low as −25 degrees. Regions of the initial occupancy map shown in black indicate regions of the field of view that include spatial points where sensor readings were received and determined to be valid using a first set of criteria.

FIG. 9B shows a filtered occupancy map based on the initial occupancy map. In some cases, the filtered occupancy map is produced by applying a second set of criteria to the data from the initial occupancy map. The second set of criteria is useful for cleaning up the raw data depicted in the initial occupancy map and can include both temporal and spatial criteria for cleaning up the raw data (e.g., correcting false negatives and/or false positives in the initial occupancy map).

FIG. 9C shows a blockage map. In certain cases, the blockage map is generated by applying a third set of criteria to the data depicted in the filtered occupancy map. The third set of criteria splits the filtered occupancy map into regions made up of multiple points and determines whether each region has a sufficient number of sensor data points to preclude the presence of a sensor blockage. In the illustrated example, each region occupies occupy a full range of elevation for a particular azimuth or range of azimuths. It will be understood, however, that a region can be configured to have different shapes and/or sizes, as desired. Considering the full range of elevation can be useful in situations where the sensor window height is particularly small since any sensor blockage is likely to occupy most if not all points of a particular elevation. This can enable the system to identify blockages of the sensor at between approximately −50 and −95 degrees and between −110 and −125 degrees.

Example Process for Detecting Sensor Blockages and Operating the Sensor Based on the Detection of the Sensor Blockages FIG. 10 shows a flow chart of an example process 1000 for detecting lidar sensor blockages. For convenience, the process 1000 will be described as being performed by a system of one or more computers located in one or more locations. For example, one of the computing systems depicted in FIG. 2, appropriately programmed in accordance with this specification, can perform the process 1000.

At step 1002, sensor detection data is received at one or more processors of the system. The sensor detection data can take the form of an unstructured three-dimensional point cloud formed from lidar return data and/or radar return data that includes range values, amplitude and/or phase of return signals (or other technology as described herein). The sensor detection data can be representative of multiple points surrounding AV 100 and can be defined in a variety of coordinate systems such as, e.g., azimuth and elevation, x-y pairs and/or polar coordinates.

At step 1004, an initial occupancy map can be generated by organizing the sensor detection data into a two-dimensional map, array or image matrix that represents a field of view of the lidar sensor. An exemplary initial occupancy map is described above and depicted in FIG. 9A. Generation of the occupancy map can be performed by determining (e.g., assigning) a first set of occupancy values for the points surrounding the vehicle. In some embodiments a determination is made for all of the points surrounding the vehicle and in other embodiments the determination is made for only a subset of the points surrounding the vehicle. A determination may be skipped when a particular point is already expected to not receive data due to a location of AV 100 or other known sensor occlusions. Determining the first set of occupancy values includes determining whether measurement(s) have been obtained at respective points. This determination is generally made based on a first set of criteria. For example, a return signal received at a respective point might be required to meet a detection threshold or signal strength. In accordance with a determination that the return signal meets at least the detection threshold of the first set of criteria, an occupancy value for the return signal is set to true or to a first occupancy value. In accordance with a determination that the return signal fails to meet the detection threshold, the occupancy value for the return signal is set to false or to a second occupancy value. In either case, this binary value replaces any range information associated with the respective point. It should be noted that the first set of criteria can include additional requirements for a particular set of sensor detection data to constitute a valid return.

At step 1006, a filtered occupancy map is generated based on the initial occupancy map. An exemplary filtered occupancy map is depicted in FIG. 9B. The filtered occupancy map can be generated from the initial occupancy map by determining whether each of the respective points of the initial occupancy map meet a second set of criteria. The second set of criteria can include spatial and/or temporal criteria. An exemplary spatial criteria can be based on whether a point having the second occupancy value (e.g., false or no measurement) in the initial occupancy map is a threshold distance from a threshold number of points having the first occupancy value (e.g., true or measurement detected). For example, where the respective point has few or no neighboring points with the second occupancy value (e.g., few or no neighboring points without a measurement), the spatial criteria of the second set of criteria could be met and the respective point could be reset to the first occupancy value. Similarly, where the respective point has the first occupancy value but is surrounded by points with the second occupancy value, the spatial criteria could be failed and the occupancy value could be reset to the second occupancy value. An exemplary temporal criteria could be based on whether the respective point has a threshold number of detections over a particular period of time. For example, when the respective point has received detections at least 80 or 90 percent of the time before and/or after recordation of the respective point could be considered to meet the temporal criteria of the second set of criteria, thereby allowing the second occupancy value to be changed to the first occupancy value. A more conservative evaluation could assign the first occupancy value to a point when any of the past M−1 frames have had a valid detection at the respective point. It should be noted that temporal time spans are generally referred to with respect to frame numbers and an amount of time occupied by each frame corresponds to a sampling frequency of the lidar sensor. In some embodiments, the lidar sensor can be configured to record up to 1.5 million data points per second; however, it should be noted that this covers the entire field of view, so a modern lidar system will generally generate between five and fifty frames per second.

In accordance with a determination that a respective point meets the second set of criteria, its occupancy value is set to the first occupancy value. Furthermore, in accordance with a determination that the respective point fails to meet the second set of criteria, its occupancy value is set to the second occupancy value. It should be appreciated that a respective point could be considered to meet the second set of criteria only when both temporal and spatial criteria are met. Alternatively, there could also be a weighting criteria that allows the second set of criteria to be met, when only one of the spatial criteria or the temporal criteria are met. For example, if every one of the points surrounding a respective point has the first occupancy value but data is received at the respective point only about 50% of the time, the respective point could still be assigned the first occupancy value.

In some embodiments, only points from the initial occupancy map that were assigned the second occupancy value are evaluated using the second set of criteria and points indicated as having the first occupancy value in the initial occupancy map are carried over to the filtered occupancy map. In this particular embodiment, application of the second set of criteria can be referred to as spatial and temporal hole closing. This operation prevents the system from erroneously identifying a blockage where only a particularly small area of the field of view is blocked or has ceased functioning when the area is not of sufficient size to impair operation of the lidar sensor. This operation also helps prevent erroneous blockage identification where only a small number of frames of data are missing for the respective point before and/or after the current frame being analyzed. In some embodiments, a second sensor (e.g., an imaging sensor) can be used to help determine the presence of an object near AV 100 when the object has properties that make its detection by the lidar sensor difficult or even impossible. In such a situation missing sensor detection data can be filled in using sensor data provided by the second sensor.

At step 1008, a blockage map is generated based on the filtered occupancy map. The blockage map is generated by applying a third set of criterion to the at least some of the points represented in the filtered occupancy map. In some embodiments, the third set of criteria determines whether a particular region of the filtered occupancy map has a threshold number (quantity) or percentage of points indicated as having the first occupancy value. The regions can have different shapes and sizes, such as rectangular, circular and/or elliptical. The region can include all points falling within a first dimension, such as an azimuth (e.g., 35 degrees or a range within the first dimension such as 35-40 degrees) and the threshold can be, e.g., 30%, 40%, 50%, 60%, 70%, 80%, 90% or 95%. Where the threshold is met all points within the region can be assigned the first occupancy value and where the threshold is not met all points within the predetermined area can be assigned the second occupancy value. Assignment of the second occupancy value to the predetermined area can be reported as a blockage within the region. The reported blockage can be characterized as a solid obstacle located on a sensor window of the sensor. In some embodiments, the entire filtered occupancy map can be divided into multiple adjacent regions. In the case two or more adjacent regions are assigned the second occupancy value, the multiple blocked regions can be defined as a single blockage encompassing the two or more adjacent regions.

False positive sensor blockages can be suppressed in a number of ways. In some embodiments, geographic map data can be used to further suppress false positives. This can be useful in situations where known types of objects that are unlikely to be detectable by the lidar sensor are known to be in close proximity to AV 100. For example, when an AV 100 is driving near a large body of water sensor returns can be lost since the light emitted by the lidar sensor is unlikely to reflect back off the water and back to the lidar sensor. A portion of the sensor field of view known to be monitoring the body of water can be removed from sensor blockage analysis. Similarly, when AV 100 is driving in a location where a large area of the sky is visible, upper portions of the field of view will generally not receive any useful signal returns. In these types of situations, the geographical data can help identify these known object types and ignore blockage indications where the blockage can be linked to the known object type. With the sky example, an upper portion of the field of view could be removed from the analysis. The geographical data can inform a processor of the system what elevation to start ignoring data returns for the purpose of detecting sensor blockages. In some embodiments, portions of AV 100 itself can block portions of the lidar sensor field of view. In such a configuration sensor blockages caused by AV 100 can be ignored or factored into the blockage analysis. Other common causes of failed sensor returns include black colored cars and wet roads.

Identified blockages can be used by AV 100 in different ways. Where a large portion of the field of view is blocked, AV 100 can be configured to cease autonomous operations or rely more heavily on backup sensors. In such a case, occupants of AV 100 would be notified by auditory or visual means of the blockage. Minor blockages might degrade full autonomous operation or cause AV 100 to operate more conservatively in particular situations. In some embodiments, AV 100 has a lidar sensor blockage cleaning or clearing system, such as a water jet, sensor window wiping mechanism or other means for cleaning or clearing a sensor window associated with the lidar sensor.

Object Misses

As described herein, transitory object misses or undetections can be caused by any one or combination of scenarios, such as, but not limited to, no object within a threshold distance (e.g., no object to reflect a beam or wave, such as when a portion of a sensor is directed to the sky), an object that does not reflect the wave or beam back to the sensor (e.g., water), signal noise, etc. Transitory object misses or undetections may resolve themselves or be passively resolved (e.g., without active steps taken by something or someone else) over a relatively short period of time (e.g., a few second or less than a minute). For example, if a transitory object undetection is due to a scene not having an object to reflect a beam or wave (or the object not reflecting the beam or wave back to the sensor), the object undetection will be resolved as the vehicle moves to a different scene (that has an object that reflects the beam or wave).

Static object misses or undetections may also be caused by one or more scenarios, such as, but not limited to, a sensor blockage or malfunction. Static object misses or undetections may not resolve themselves and/or rely on active steps taken by something or someone else to be resolved. For example, if a static object undetection is due to a sensor blockage, the undetection may not be resolved until the sensor is cleaned or serviced.

Given that transitory object misses or undetections are to be expected based on a scene or vehicle location and resolve themselves while static object undetections may require active steps, the system can determine whether an object undetection is a transitory object undetection or a static object undetection. If the object undetection is static, the system can send an alert or take steps to ameliorate the issue, whereas if the undetection is transitory, the system can give the undetection time to resolve itself.

Figure 11:
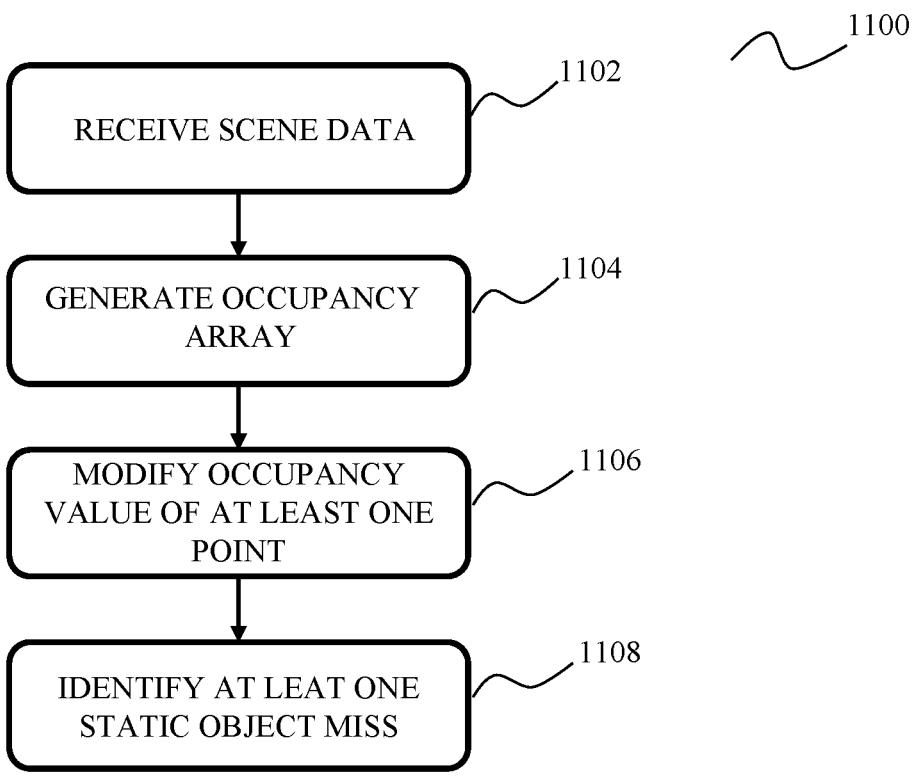
FIG. 11 is a flow diagram illustrating an example of a routine for detecting a static object miss.

FIG. 11 is a flow diagram illustrating an example of a routine 1100 implemented by at least one processor to detect a static object miss. The routine 1100 is provided for illustrative purposes only. It will be understood that one or more of the steps of the routine 1100 may be removed or that the ordering of the steps may be changed. In certain cases, one or more steps may be performed simultaneously or concurrently. Furthermore, for the purposes of illustrating a clear example, one or more particular system components are described in the context of performing various operations during each of the data flow stages. However, other system arrangements and distributions of the processing steps across system components may be used.

At block 1102, the processor receives scene data. The scene data can include data related to the vehicle 100 and/or other objects within the scene of the vehicle 100 (also referred to herein as a vehicle scene). In some cases, the scene data can indicate whether an object is detected at a particular location, such as objects around the vehicle 100 (non-limiting example: objects identified by the perception module 402), and/or the type of object detected. As described herein, the objects may include, but are not limited to pedestrians, bicycles, other vehicles, signs, curbs, buildings, etc. As a non-limiting example, the scene data 502 can include data associated with the position, orientation, velocity, acceleration, or other information of the vehicle and/or the objects in the scene (also be referred to herein as scene state data or state data).

The scene data may be obtained from a sensor suite associated with the perception module 402 (or other source) and be based on data obtained from a sensor suite that includes one or more devices such as cameras, lidar sensors, radar sensors, sonar sensors, and/or microphones, or communications with the objects (e.g., wireless communications with other vehicles), etc. As described herein, the scene data can include any one or any combination of, acceleration, velocity, position (relative to vehicle 100 or absolute/geographic), orientation/heading, classification, or size, etc., of the objects.

In certain cases, the scene data can indicate whether an object is identified at a particular point around the vehicle. In some cases, the scene data can include data corresponding to a 360-degree view (or different azimuth) around the vehicle at the same or different elevations. In certain cases, the scene data can include data corresponding to +/−30-degree elevation from a center point. In some such cases, the center point can correspond to the elevation of the one or more sensors associated with the scene data (e.g., sensors that generated or were used to derive the scene data). In certain cases, the sensor can detect different up/down elevations relative to the sensor. For example, the sensor may be configured to detect an elevation of 20 degrees up and −25 degrees down.

At block 1104, the processor generates an occupancy array based on the scene data. In some cases, the occupancy array can include points arranged in different rows and columns. However, it will be understood that the occupancy array can be arranged in a variety of ways. Each point in the occupancy array can correspond to a location in the scene or around the vehicle. For example, if the scene data includes data from 360 degrees (or some other azimuth) with a 30-degree elevation, each point in the array can correspond to some point within that scene data.

In some cases, the rows of the occupancy array can correspond to different elevations. For example, a particular row (e.g., the middle row) can correspond to an elevation of zero relative to the location of the sensor. However, it will be understood that any row can be configured to have an elevation of zero relative to the sensor based on the setup of the sensor and the array. In certain cases, the top and bottom rows of the occupancy array can correspond to the extremes of the elevation (e.g., minimum elevation and maximum elevation). However, it will be understood that the top and bottom rows can be configured in a variety of ways.

The columns of the array can correspond to different azimuths from a center point. For example, if there are 360 columns and scene data has an azimuth of 360 degrees, each column can correspond to one degree of the 360-degree azimuth (different azimuth measures and/or different number of columns can be used as desired). If there are additional columns, each column can correspond to a smaller portion of the 360-degree azimuth, or if the number of columns is less than the azimuth of the scene data, the columns can correspond to a larger portion of the azimuth.

Each point in the array can include an occupancy value. The occupancy value can indicate whether an object was detected at the location corresponding to that point. In some cases, the occupancy value can be a binary value indicating that an object was or was not detected at that point (e.g., "object detected" or "object miss"). In certain cases, the occupancy value can indicate a likelihood or probability that an object was/was not detected at that point. In some cases, the points and/or occupancy value can further indicate a location of the detected object relative to the sensor. For example, the point and/or occupancy value can indicate an x, y, z coordinate of the object relative to the sensor.

As described herein, in some cases, the processor can determine the occupancy value for the points in the occupancy array based on a received signal. For example, if a return signal received at a respective point satisfies a detection threshold or signal strength threshold, the processor can set the occupancy value for the point to indicate "object detected" or "true." This can be in the form of a logical one or some other indicator. Based on a determination that the return signal fails to meet the detection threshold or signal strength threshold, the processor can set the occupancy value for the point to indicate "object miss," "object undetected," or "false." This can be in the form of a logical zero or some other indicator. In either case, in certain cases, this binary value can replace range information associated with the respective point. It should be noted that the first set of criteria can include additional requirements for a particular set of sensor detection data to constitute a valid return.

At block 1106, the processor modifies the occupancy value of one or more points. In some cases, the processor can modify an occupancy value of one or more points from an indication of an object miss to an indication of an "object detected" or "transitory object miss."

As described herein, an object miss can be transitory or static. To identify static object misses, the processor can analyze object misses in the array and determine whether the object miss for a particular point is a transitory object miss or a statis object miss. For transitory object misses in the points of the array, the processor can modify the occupancy value to indicate that objects have been detected at that point, that the object miss for that point is a transitory object miss, or that an object "is/was detected" at that point.

In some cases, the processor modifies an occupancy value of one or more points based on a determined location of the vehicle or location data associated with the vehicle. As described herein, the location of the vehicle can be determined using a variety of techniques and/or sensors, such as, but not limited to, a localization sensor (e.g., GPS, etc.), comparing scene data with scene data of a map, identification of landmarks, etc.

Based on a determined location of the vehicle, the processor can determine whether a particular point corresponds to a location around the vehicle that is likely to not detect an object. In some cases, the location can correspond to, but are limited to, the location of a (large) body of water, such as, but not limited to, a lake, large river, ocean, sea, etc. In certain cases, the location may correspond to the sky, etc.

Based on the determined location and the determination that the particular point is corresponds to a location of an object that would not be expected to reflect a wave or beam, the processor can adjust the occupancy value for the particular point from "object miss" to "transitory object miss" or "object detected." In this way, the processor can identify points with object misses as transitory object misses and/or eliminate points as potentially having static object misses In certain cases, the processor can modify the occupancy value of one or more points based on temporal data of the one or more points. As described herein, as a vehicle moves, a sensor will encounter different scenes (at different locations). In some cases, a point of the array may correspond to a location in the scene where there is no object to detect, or a non-reflective object is located. However, the times in which the point corresponds to a location where there is no reflection from an object will vary (e.g., sometimes the point will indicate an object detected and sometimes it will indicate an object miss). Accordingly, if a point sometimes detects an object and sometimes does not, the processor can determine that a current object miss is transitory and not static. In some cases, to determine that a current object miss is transitory or static, the processor can compare temporal data of the point. If at a first time, the occupancy value of the point indicates an object is detected and at a second time (after the first time) the occupancy value for the same point indicates an object miss, the processor can determine that the object miss is transitory and adjust the occupancy value at the second time to indicate "object detected" or "transitory object miss."

In certain cases, the processor can use a threshold number of detections over a period of as time (or number of frames) as temporal criteria to determine whether to modify the occupancy value. In some such cases, if the occupancy value for the point satisfies the threshold number of detection over the period of time (or number of frames), the occupancy value for that point for any time during that time period (or any frame within the number of frames) can be set to "object detected." In this way, the processor can identify points with object misses as transitory object misses and/or eliminate points as potentially having static object misses.

In some cases, the processor can modify the occupancy value of one or more points based on the occupancy value of other points in the array. In some such cases, the processor can analyze a group of points and adjust the value of some of the points to match the occupancy value of the others. In some cases, the group of points can be a contiguous group of points that span multiple rows and/or columns. In some such cases, the group of points analyzed (and the points modified) can be in the same column or row. In certain cases, the group of points analyzed can comprise one or more entire columns or rows. In certain cases, the group of points can be in the shape of a square, rectangle, or other shape. For example, if within a 20×20 region of points, seventeen points include an occupancy value that indicates an object is detected and three indicate object misses, the processor can determine that the object misses are likely transitory (and/or that the object miss is likely due to noise or something other than a sensor malfunction or blockage), and adjust the occupancy value of the three points to indicate "object detected" or "transitory object miss." In some cases, the processor can use one or more criteria to determine whether to change the occupancy value of a subset of points in a region from "no object detected" to "object detected." In certain cases, the criteria can indicate that an occupancy value for a point can be changed if some, a majority, or all of the proximate or adjacent points have an occupancy value of "object detected," or if a percentage of points within a region have an occupancy value of "object detected."

In certain cases, if the majority (or >70% or 80% or some other threshold) of the group of points have an occupancy value of "object miss," the processor can adjust the occupancy value of the other points in the group from "object detected" to "object miss." In some such cases, the group of points analyzed (and the points modified) can be in the same column or row. In certain cases, the group of points analyzed can comprise one or more entire columns or rows.

In some cases, the processor can use spatial criteria to modify the occupancy value. The spatial criteria can be based on whether a point having one occupancy value in the occupancy map is a threshold distance from a threshold number of points having a different occupancy value. The threshold distance can be contiguous or adjacent points, or points within a threshold number of points and the threshold number can be a threshold percentage of points within a particular region or group. For example, where a particular point has few or no neighboring points indicating "object miss," the processor can determine that the spatial criteria is met and the occupancy value of the particular point can be modified to "object detected," etc. (or vice versa).

In certain cases, the processor can analyze an entire column (or row) to determine whether the occupancy value of all points in the row should be modified. In some such cases, the processor can analyze an entire row after it has modified points in the array based on temporal data, location data of the vehicle, and/or smaller regions. FIG. 9B-9C is an example of an analysis of entire columns by the processor to modify occupancy values of the points in the particular column.

At block 1108, the processor identifies at least one static object miss. As described herein, the static object miss can indicate a sensor blockage, sensor malfunction or other factor that causes a static object miss and can be based on the occupancy value of multiple points within a region of the occupancy array.

In some cases, the processor identifies the static object miss after analyzing the points for transitory object misses and/or adjusting the occupancy value of at least one point. In certain cases, the processor identifies a static object miss based on a group of points in a particular region (e.g., more than one, a majority, a threshold number, etc.). In some cases, the group of points can share the same occupancy value (e.g., "object miss," or a probability of "no object" below a threshold amount). In certain cases, the group of points can be in the same column or azimuth and/or be contiguous. For example, the processor can determine a static object miss if a threshold number of points in the same column or azimuth include an occupancy value of "object miss". In some cases, the threshold can be 90% of points in the column (or some other threshold value as desired). Depending on the orientation, in certain cases, the processor can determine a static object miss if a threshold number of points in the same row or elevation include an occupancy indicating an object miss.

Fewer, more, or different or different blocks can be used with routine 1100. For example, in some cases, the processor can, based on the detection of a blockage, indicate that a sensor is to be cleaned, initiate an alert that there is a sensor blockage, communicate an alert to a user, a planning module (or system), or a control module (or system) that a static object miss (e.g., sensor blockage or malfunction) is detected, initiate a process, or cause the vehicle 100, to end an autonomous mode (e.g., cease autonomous driving of the vehicle) and/or to stop moving, cease operation of the sensor, switch to different sensors (if available) and/or decrease an amount of trust placed in the sensor's data, etc.).

In some cases, the processor can successively or concurrently analyze all of the points of the array (for transitory static misses) before identifying a static object miss. In some such cases, the processor can analyze the points row-by-row or column-by-column. In certain cases, the processor can successively or concurrently analyze (only) the points that indicate an "object miss." In this way, the processor can the processing time by reducing the number of points to analyze. This can save power consumption and increase the speed of the static object miss detection.

ADDITIONAL EXAMPLES

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:

receiving scene data associated with an environment of an autonomous vehicle based on signals detected by a sensor;

generating an occupancy array based on the scene data, wherein the occupancy array comprises:

a plurality of points, wherein each point represents a location within the environment, and an occupancy value for each point, wherein the occupancy value for a particular point of the plurality of points indicates whether an object is detected at a particular location within the environment that corresponds to the particular point defined at least partly relative to a position of the sensor;

modifying the occupancy value of at least one first point of the plurality of points that initially indicates non-occupancy to indicate occupancy, wherein the at least one first point is selected from the plurality of points based at least on the at least one first point indicating non-occupancy at a current time and a corresponding point from a previously generated occupancy array indicating occupancy during a future period of time;

identifying at least one static object miss based on a group of occupancy values of a group of points of the plurality of points within a particular region of the occupancy array, wherein the group of occupancy values includes the occupancy value of that at least one first point; and navigating the autonomous vehicle based on modifying the occupancy value of the at least one first point of the plurality of points that initially indicates non-occupancy to indicate occupancy and based on identifying the at least one static object miss.

2. The method of claim 1, wherein each column of the occupancy array represents a different azimuth around the autonomous vehicle and each row of the occupancy array represents a different angular elevation.

3. The method of claim 1, wherein identifying at least one static object miss based on the group of occupancy values of the group of points within the particular region comprises determining that a threshold quantity of the group of occupancy values indicate no object is detected.

4. The method of claim 1, wherein the group of points comprises points that correspond to a same azimuth angle.

5. The method of claim 1, wherein modifying the occupancy value of at least one first point of the plurality of points further comprises modifying the occupancy value of at least one first point of the plurality of points based on a determined location of the autonomous vehicle.

6. The method of claim 5, wherein modifying the occupancy value of at least one first point of the plurality of points based on the determined location of the autonomous vehicle comprises:

identifying a body of water within the environment of the autonomous vehicle based on a comparison of the determined location of the autonomous vehicle with a map that includes the determined location;

determining that the at least one first point corresponds to the body of water; and modifying the at least one first point to indicate a presence of an object.

7. The method of claim 1, wherein the occupancy value of the at least one first point is further modified based on the occupancy value of at least one second point, and wherein modifying the occupancy value of the at least one first point based on the occupancy value of at least one second point comprises determining each occupancy value corresponding of a set of points proximate the at least one first point indicate an object is detected; and modifying the occupancy value of the at least one first point to indicate an object is detected.

8. A system comprising:

a data store storing computer-executable instructions; and a processor configured to execute the computer-executable instructions, wherein execution of the computer-executable instructions causes the system to:

receive scene data associated with an environment of an autonomous vehicle based on signals detected by a sensor;

generate an occupancy array based on the scene data, wherein the occupancy array comprises:

a plurality of points, wherein each point represents a location within the environment defined at least partly relative to a position of the sensor, and an occupancy value for each point, wherein the occupancy value for a particular point of the plurality of points indicates whether an object is detected at a particular location within the environment that corresponds to the particular point;

modify the occupancy value of at least one first point of the plurality of points that initially indicates non-occupancy to indicate occupancy, wherein the at least one first point is selected from the plurality of points based at least on the at least one first point indicating non-occupancy at a current time and a corresponding point from a previously generated occupancy array indicating occupancy during a future period of time;

identify at least one static object miss based on a group of occupancy values of a group of points of the plurality of points within a particular region of the occupancy array, wherein the group of occupancy values includes the occupancy value of that at least one first point; and navigate the autonomous vehicle based on modifying the occupancy value of the at least one first point of the plurality of points that initially indicates non-occupancy to indicate occupancy and based on identifying the at least one static object miss.

9. The system of claim 8, wherein to modify the occupancy value of at least one first point of the plurality of points, the execution of the computer-executable instructions cause the system to modify the occupancy value of at least one first point of the plurality of points based on a determined location of the autonomous vehicle.

10. The system of claim 9, wherein to modify the occupancy value of at least one first point of the plurality of points based on the determined location of the autonomous vehicle, the execution of the computer-executable instructions cause the system to identify a body of water within the environment of the autonomous vehicle based on a comparison of the determined location of the autonomous vehicle with a map that includes the determined location;

determine that the at least one first point corresponds to the body of water; and modify the at least one first point to indicate a presence of an object.

11. The system of claim 8, wherein the occupancy value of the at least one first point indicates no object is detected, wherein the processor is configured to modify the occupancy value of the at least one first point based on the occupancy value of at least one second point, and wherein to modify the occupancy value of the at least one first point based on the occupancy value of at least one second point, the execution of the computer-executable instructions cause the processor to determine each occupancy value corresponding to a set of points proximate the at least one first point indicate an object is detected; and modify the occupancy value of the at least one first point to indicate an object is detected.

12. One or more non-transitory computer-readable media comprising computer-executable instructions that, when executed by a computing system, cause the computing system to:

receive scene data associated with an environment of an autonomous vehicle based on signals detected by a sensor;

generate an occupancy array based on the scene data, wherein the occupancy array comprises:

a plurality of points, wherein each point represents a location within the environment defined at least partly relative to a position of the sensor, and an occupancy value for each point, wherein the occupancy value for a particular point of the plurality of points indicates whether an object is detected at a particular location within the environment that corresponds to the particular point;

modify the occupancy value of at least one first point of the plurality of points that initially indicates non-occupancy to indicate occupancy, wherein the at least one first point is selected from the plurality of points based at least on the at least one first point indicating non-occupancy at a current time and a corresponding point from a previously generated occupancy array indicating occupancy during a future period of time;

identify at least one static object miss based on a group of occupancy values of a group of points of the plurality of points within a particular region of the occupancy array, wherein the group of occupancy values includes the occupancy value of that at least one first point; and navigate the autonomous vehicle based on modifying the occupancy value of the at least one first point of the plurality of points that initially indicates non-occupancy to indicate occupancy and based on identifying the at least one static object miss.

13. The one or more non-transitory computer-readable media of claim 12, wherein to identify at least one static object miss based on the group of occupancy values of the group of points within the particular region, the execution of the computer-executable instructions cause the system to determine that a threshold quantity of the group of occupancy values indicate no object is detected.

14. The one or more non-transitory computer-readable media of claim 12, wherein to modify the occupancy value of at least one first point of the plurality of points, the execution of the computer-executable instructions cause the system to modify the occupancy value of at least one first point of the plurality of points based on a determined location of the autonomous vehicle.

15. The one or more non-transitory computer-readable media of claim 12, wherein the occupancy value of the at least one first point indicates no object is detected, wherein the execution of the computer-executable instructions cause the system to modify the occupancy value of the at least one first point based on the occupancy value of at least one second point, and wherein to modify the occupancy value of the at least one first point based on the occupancy value of at least one second point, the execution of the computer-executable instructions cause the system to determine each occupancy value corresponding to a set of points proximate the at least one first point indicate an object is detected and modify the occupancy value of the at least one first point to indicate an object is detected.

* * * * *